United States Patent
Oren

(10) Patent No.: US 10,239,436 B2
(45) Date of Patent: Mar. 26, 2019

(54) TRAILER-MOUNTED PROPPANT DELIVERY SYSTEM

(71) Applicant: Oren Technologies, LLC, Houston, TX (US)

(72) Inventor: Joshua Oren, Houston, TX (US)

(73) Assignee: OREN TECHNOLOGIES, LLC, Houston, TX (US)

( * ) Notice: Subject to any disclaimer, the term of this patent is extended or adjusted under 35 U.S.C. 154(b) by 0 days.

(21) Appl. No.: 15/616,783

(22) Filed: Jun. 7, 2017

(65) Prior Publication Data

US 2017/0267151 A1    Sep. 21, 2017

Related U.S. Application Data

(63) Continuation of application No. 15/152,744, filed on May 12, 2016, now Pat. No. 9,758,081, which is a continuation of application No. 14/175,340, filed on Feb. 7, 2014, now Pat. No. 9,421,899, which is a continuation-in-part of application No. 13/628,702, filed on Sep. 27, 2012, which is a continuation-in-part of application No. 13/555,635, filed on Jul. 23, 2012, now Pat. No. 9,718,610.

(51) Int. Cl.
  *B60P 1/52* (2006.01)
  *B60P 1/56* (2006.01)

(52) U.S. Cl.
  CPC .. *B60P 1/52* (2013.01); *B60P 1/56* (2013.01)

(58) Field of Classification Search
  CPC .................................. B60P 1/52; B60P 1/56
  USPC ........................................................ 414/529
  See application file for complete search history.

(56) References Cited

U.S. PATENT DOCUMENTS

| 137,871 A | 4/1873 | Worsley |
| D150,894 S | 5/1874 | Safely |
| 384,443 A | 6/1888 | Hoover |

(Continued)

FOREIGN PATENT DOCUMENTS

| CA | 2023138 | 2/1992 |
| CA | 2791088 | 11/2018 |

(Continued)

OTHER PUBLICATIONS

Yergin, Daniel, The Quest: Energy, Security, and the Remaking of the Modern World, 2011.

(Continued)

*Primary Examiner* — Kaitlin S Joerger
(74) *Attorney, Agent, or Firm* — Hogan Lovells US LLP

(57) ABSTRACT

An apparatus and process for delivering proppant to a well site has a trailer with a bed thereon and at least one track of rollers extending in parallel relationship to the longitudinal axis of the trailer. The track of rollers extend substantially for an entire length of the bed of the trailer. At least one proppant container is translatably positioned on the track of rollers. The proppant container is movable along the array of rollers from one end of the bed to an opposite end of the bed. A bin can be removably positioned below the bed of the trailer in a position rearward of the front end of the trailer and forward of a rear end of the trailer so as to allow the proppant container to discharge into the bin. A conveyor is cooperative with the bin so as to move proppant from the bin to a location at the well site.

14 Claims, 4 Drawing Sheets

(56) References Cited

U.S. PATENT DOCUMENTS

| | | | |
|---|---|---|---|
| 448,238 | A | 3/1891 | Johnson |
| 710,611 | A | 10/1902 | Ray |
| 711,632 | A | 10/1902 | Johnson |
| 917,649 | A | 4/1909 | Otto |
| 1,143,641 | A | 6/1915 | McGregor |
| 1,331,883 | A | 2/1920 | Stuart |
| 1,344,768 | A | 6/1920 | Messiter |
| 1,434,488 | A | 11/1922 | Forsythe et al. |
| 1,520,560 | A | 12/1923 | Burno |
| 1,506,936 | A | 9/1924 | Lea |
| 1,526,527 | A | 2/1925 | Butler |
| 1,573,664 | A | 2/1926 | Wetherill |
| 1,807,447 | A | 5/1931 | Smith |
| 1,850,000 | A | 3/1932 | Fernand |
| 1,932,320 | A | 10/1933 | Steward |
| 1,973,312 | A | 9/1934 | Hardinge |
| 2,020,628 | A | 11/1935 | Woodruff |
| 2,233,005 | A | 2/1941 | Garlinghouse |
| 2,255,448 | A | 9/1941 | Morris |
| 2,293,160 | A | 8/1942 | Miller et al. |
| 2,368,672 | A | 2/1945 | McNamara |
| 2,381,103 | A | 8/1945 | Frank |
| 2,385,245 | A | 9/1945 | Willoughby |
| 2,413,661 | A | 12/1946 | Stokes |
| 2,423,879 | A | 7/1947 | De Frees |
| 2,563,470 | A | 8/1951 | Kane |
| 2,564,020 | A * | 8/1951 | Mengel .................. B60P 1/56 222/136 |
| 2,603,342 | A | 7/1952 | Martinson |
| 2,616,758 | A | 11/1952 | Meyers |
| 2,622,771 | A | 12/1952 | Tulou |
| 2,652,174 | A | 9/1953 | Shea et al. |
| 2,670,866 | A | 3/1954 | Glesby |
| 2,678,145 | A | 5/1954 | Ejuzwiak et al. |
| 2,693,282 | A | 11/1954 | Sensibar |
| 2,700,574 | A | 1/1955 | Tourneau |
| 2,792,262 | A | 4/1955 | Hathorn |
| 2,774,515 | A | 12/1956 | Johansson et al. |
| 2,791,973 | A | 5/1957 | Dorey |
| 2,801,125 | A | 7/1957 | Page et al. |
| 2,808,164 | A | 10/1957 | Glendinning |
| 2,812,970 | A | 11/1957 | Martinson |
| 2,837,369 | A | 6/1958 | Stopps |
| 2,865,521 | A | 12/1958 | Fisher et al. |
| 2,873,036 | A | 2/1959 | Noble |
| 2,894,666 | A | 7/1959 | Campbell, Jr. |
| 2,988,235 | A | 6/1961 | Ronyak |
| 2,994,460 | A | 8/1961 | Matthews |
| 3,041,113 | A | 6/1962 | Sackett |
| 3,049,248 | A | 8/1962 | Heltzel et al. |
| 3,064,832 | A | 11/1962 | Heltzel |
| 3,083,879 | A | 4/1963 | Coleman |
| 3,090,527 | A | 5/1963 | Rensch |
| 3,109,389 | A | 11/1963 | Karlsson |
| 3,122,258 | A | 2/1964 | Raymond |
| 3,135,432 | A | 6/1964 | McKinney |
| 3,163,127 | A | 12/1964 | Gutridge et al. |
| 3,187,684 | A | 6/1965 | Ortner |
| 3,198,494 | A | 8/1965 | Curran et al. |
| 3,199,585 | A | 8/1965 | Cronberger |
| 3,248,026 | A | 4/1966 | Kemp |
| 3,255,927 | A | 6/1966 | Ruppert et al. |
| 3,265,443 | A | 8/1966 | Simas |
| 3,270,921 | A | 9/1966 | Nadolske et al. |
| 3,281,006 | A | 10/1966 | Tonchung |
| 3,294,306 | A | 12/1966 | Areddy |
| 3,318,473 | A | 5/1967 | Jones et al. |
| 3,326,572 | A | 6/1967 | Murray |
| 3,343,688 | A | 9/1967 | Ross |
| 3,353,599 | A | 11/1967 | Swift |
| 3,354,918 | A | 11/1967 | Coleman |
| 3,378,152 | A | 4/1968 | Warner |
| 3,387,570 | A | 6/1968 | Pulcrano et al. |
| 3,396,675 | A | 8/1968 | Stevens |
| 3,397,654 | A | 8/1968 | Snyder |
| 3,406,995 | A | 10/1968 | McCarthy |
| 3,407,971 | A | 10/1968 | Oehler |
| 3,425,599 | A | 2/1969 | Sammarco et al. |
| 3,455,474 | A * | 7/1969 | Truncali .................. B60P 1/52 414/485 |
| 3,476,270 | A | 11/1969 | Cox et al. |
| 3,486,787 | A | 12/1969 | Campbell |
| 3,499,694 | A | 3/1970 | Coppel |
| 3,508,762 | A | 4/1970 | Pratt |
| 3,524,567 | A | 8/1970 | Coleman |
| 3,528,570 | A | 9/1970 | Pase |
| 3,561,633 | A | 2/1971 | Morrison et al. |
| 3,587,834 | A | 6/1971 | Dugge |
| 3,596,609 | A | 8/1971 | Ortner |
| 3,601,244 | A | 8/1971 | Ort et al. |
| 3,602,400 | A | 8/1971 | Cooke |
| 3,650,567 | A | 3/1972 | Danielson |
| 3,653,521 | A | 4/1972 | Bridge |
| 3,661,293 | A | 5/1972 | Gerhard et al. |
| 3,692,363 | A | 9/1972 | Tenebaum et al. |
| 3,704,797 | A | 12/1972 | Suykens |
| 3,721,199 | A | 3/1973 | Hassenauer |
| 3,729,121 | A | 4/1973 | Cannon |
| 3,734,215 | A | 5/1973 | Smith |
| 3,738,511 | A | 6/1973 | Lemon et al. |
| 3,752,511 | A | 8/1973 | Racy |
| 3,777,909 | A | 12/1973 | Rheinfrank |
| 3,785,534 | A | 1/1974 | Smith |
| 3,800,712 | A | 4/1974 | Krug, Jr. |
| 3,802,584 | A | 4/1974 | Sackett |
| 3,817,261 | A | 6/1974 | Rogge |
| 3,820,762 | A | 6/1974 | Bostrom et al. |
| 3,827,578 | A | 8/1974 | Hough |
| 3,840,141 | A | 10/1974 | Allom et al. |
| 3,854,612 | A | 12/1974 | Snape |
| 3,861,716 | A | 1/1975 | Baxter et al. |
| 3,883,005 | A | 5/1975 | Stevens |
| 3,904,105 | A | 9/1975 | Booth |
| 3,909,223 | A | 9/1975 | Schmidt |
| 3,913,933 | A | 10/1975 | Visser et al. |
| 3,933,100 | A | 1/1976 | Dugge |
| 3,963,149 | A | 6/1976 | Fassauer |
| 3,970,123 | A | 7/1976 | Poulton et al. |
| 3,986,708 | A * | 10/1976 | Heltzel .................. B28C 7/049 366/17 |
| 3,997,089 | A | 12/1976 | Clarke et al. |
| 3,999,290 | A | 12/1976 | Wood |
| 4,003,301 | A | 1/1977 | Norton |
| 4,004,700 | A | 1/1977 | Empey |
| 4,019,635 | A | 4/1977 | Boots |
| 4,057,153 | A | 11/1977 | Weaver |
| 4,058,239 | A | 11/1977 | Van Mill |
| 4,063,656 | A | 12/1977 | Lambert |
| 4,073,410 | A | 2/1978 | Melcher |
| 4,125,195 | A | 11/1978 | Sasadi |
| 4,138,163 | A | 2/1979 | Calvert et al. |
| 4,178,117 | A | 12/1979 | Brugler |
| 4,204,773 | A | 5/1980 | Bates |
| 4,210,273 | A | 7/1980 | Hegele |
| 4,210,963 | A | 7/1980 | Ricciardi et al. |
| RE30,358 | E | 8/1980 | Sensibar |
| 4,222,498 | A | 9/1980 | Brock |
| 4,227,732 | A | 10/1980 | Kish |
| 4,232,884 | A | 11/1980 | DeWitt |
| 4,239,424 | A | 12/1980 | Pavolka |
| 4,245,820 | A | 1/1981 | Muryn |
| 4,247,228 | A | 1/1981 | Gray et al. |
| 4,247,370 | A | 1/1981 | Nijhawan et al. |
| 4,258,953 | A | 3/1981 | Johnson |
| 4,265,266 | A | 5/1981 | Kierbow et al. |
| 4,278,190 | A | 7/1981 | Oory et al. |
| 4,280,640 | A | 7/1981 | Daloisio |
| 4,282,988 | A | 8/1981 | Hulbert, Jr. |
| 4,287,921 | A | 9/1981 | Sanford |
| 4,287,997 | A | 9/1981 | Rolfe et al. |
| 4,289,353 | A | 9/1981 | Merritt |
| 4,299,597 | A | 11/1981 | Oetiker et al. |
| 4,306,895 | A | 12/1981 | Thompson et al. |
| 4,329,106 | A | 5/1982 | Adler |

(56) References Cited

U.S. PATENT DOCUMENTS

| | | |
|---|---|---|
| 4,350,241 A | 9/1982 | Wenzel |
| 4,359,176 A | 11/1982 | Johnson |
| 4,363,396 A | 12/1982 | Wolf et al. |
| 4,395,052 A | 7/1983 | Rash |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,420,285 A | 12/1983 | Loyer et al. |
| 4,427,133 A | 1/1984 | Kierbow et al. |
| 4,428,504 A | 1/1984 | Bassett et al. |
| 4,449,861 A | 5/1984 | Saito et al. |
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,513,755 A | 4/1985 | Baroni |
| 4,525,071 A | 6/1985 | Horowitz |
| 4,526,353 A | 7/1985 | Stomp |
| 4,532,098 A | 7/1985 | Campbell |
| 4,534,869 A | 8/1985 | Seibert |
| 4,552,573 A | 11/1985 | Weis |
| 4,569,394 A | 2/1986 | Sweatman et al. |
| 4,570,967 A | 2/1986 | Allnut |
| 4,571,143 A | 2/1986 | Hellerich |
| 4,588,605 A | 5/1986 | Frei et al. |
| 4,608,931 A | 9/1986 | Ruhmann et al. |
| 4,619,531 A | 10/1986 | Dunstan |
| 4,624,729 A | 11/1986 | Bresciani et al. |
| 4,626,155 A | 12/1986 | Hlinsky et al. |
| 4,626,166 A | 12/1986 | Jolly |
| 4,628,825 A | 12/1986 | Taylor et al. |
| 4,639,015 A | 1/1987 | Pitts |
| 4,648,584 A | 3/1987 | Wamser |
| 4,660,733 A | 4/1987 | Snyder et al. |
| 4,701,095 A * | 10/1987 | Berryman .............. B65D 88/30 198/311 |
| 4,714,010 A | 12/1987 | Smart |
| 4,715,754 A | 12/1987 | Scully |
| 4,724,976 A | 2/1988 | Lee |
| 4,738,774 A | 4/1988 | Patrick |
| 4,741,273 A | 5/1988 | Sherwood |
| 4,761,039 A | 8/1988 | Hilaris |
| 4,779,751 A | 10/1988 | Munroe |
| 4,798,039 A | 1/1989 | Deglise |
| 4,801,389 A | 1/1989 | Brannon et al. |
| 4,819,830 A | 4/1989 | Schultz |
| 4,836,510 A | 6/1989 | Weber et al. |
| 4,836,735 A | 6/1989 | Dennehy |
| 4,848,605 A | 7/1989 | Wise |
| 4,882,784 A | 11/1989 | Tump |
| 4,889,219 A | 12/1989 | Key |
| 4,901,649 A | 2/1990 | Fehrenbach et al. |
| 4,909,378 A * | 3/1990 | Webb ....................... B60P 1/38 198/721 |
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,949,714 A | 8/1990 | Orr |
| 4,954,975 A | 9/1990 | Kalata |
| 4,956,821 A | 9/1990 | Fenelon |
| 4,964,243 A | 10/1990 | Reiter |
| 4,975,205 A | 12/1990 | Sloan |
| 4,975,305 A | 12/1990 | Biginelli |
| 4,995,522 A | 2/1991 | Barr |
| 5,004,400 A | 4/1991 | Handke |
| 5,028,002 A | 7/1991 | Whitford |
| 5,036,979 A | 8/1991 | Selz |
| 5,042,538 A | 8/1991 | Wiese |
| 5,069,352 A | 12/1991 | Harbolt et al. |
| 5,080,259 A | 1/1992 | Hadley |
| 5,082,304 A | 1/1992 | Preller |
| 5,102,281 A | 4/1992 | Handke |
| 5,102,286 A * | 4/1992 | Fenton ..................... B60P 1/52 193/35 A |
| 5,105,858 A | 4/1992 | Levinson |
| 5,131,524 A | 7/1992 | Uehara |
| 5,167,719 A | 12/1992 | Tamaki |
| 5,190,182 A | 3/1993 | Copas et al. |
| 5,195,861 A | 3/1993 | Handke |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,277,014 A | 1/1994 | White |
| 5,280,883 A | 1/1994 | Ibar |
| 5,286,158 A | 2/1994 | Zimmerman |
| 5,286,294 A | 2/1994 | Ebi et al. |
| 5,290,139 A | 3/1994 | Hedrick |
| 5,317,783 A | 6/1994 | Williamson |
| 5,320,046 A | 6/1994 | Hesch |
| 5,324,097 A | 6/1994 | DeCap |
| 5,339,996 A | 8/1994 | Dubbert |
| 5,345,982 A | 9/1994 | Nadeau et al. |
| 5,358,137 A | 10/1994 | Shuert et al. |
| 5,373,792 A | 12/1994 | Pileggi et al. |
| 5,392,946 A | 2/1995 | Holbrook et al. |
| 5,402,915 A | 4/1995 | Hogan |
| 5,413,154 A | 5/1995 | Hurst, Jr. et al. |
| 5,429,259 A | 7/1995 | Robin |
| 5,441,321 A | 8/1995 | Karpisek |
| 5,465,829 A | 11/1995 | Kruse |
| 5,470,175 A | 11/1995 | Jensen et al. |
| 5,470,176 A | 11/1995 | Corcoran et al. |
| 5,493,852 A | 2/1996 | Stewart |
| 5,498,119 A | 3/1996 | Faivre |
| 5,507,514 A | 4/1996 | Jacques |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |
| 5,687,881 A | 11/1997 | Rouse et al. |
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |
| 5,722,552 A | 3/1998 | Olson |
| 5,722,688 A | 3/1998 | Garcia |
| 5,746,258 A | 5/1998 | Huck |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,878,903 A | 3/1999 | Ung |
| 5,906,471 A | 5/1999 | Schwoerer |
| 5,911,337 A | 6/1999 | Bedeker |
| 5,924,829 A | 7/1999 | Hastings |
| 5,927,558 A | 7/1999 | Bruce |
| 5,960,974 A | 10/1999 | Kee |
| 5,971,219 A | 10/1999 | Karpisek |
| 5,993,202 A | 11/1999 | Yamazaki et al. |
| 5,997,099 A | 12/1999 | Collins |

(56) References Cited

U.S. PATENT DOCUMENTS

| | | | |
|---|---|---|---|
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| D431,358 S | 10/2000 | Willemsen |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,210,088 B1 | 4/2001 | Crosby |
| 6,231,284 B1 | 5/2001 | Kordel |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Otsman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,390,742 B1 | 5/2002 | Breeden |
| 6,401,983 B1 | 6/2002 | McDonald et al. |
| 6,412,422 B2 | 7/2002 | Dohr |
| 6,415,909 B1 | 7/2002 | Mitchell et al. |
| 6,416,271 B1 | 7/2002 | Pigott et al. |
| 6,422,413 B1 | 7/2002 | Hall et al. |
| 6,425,725 B1 | 7/2002 | Ehlers |
| 6,457,291 B2 | 10/2002 | Wick |
| 6,498,976 B1 | 12/2002 | Ehlbeck et al. |
| 6,505,760 B1 | 1/2003 | Werner |
| 6,508,387 B1 | 1/2003 | Simon |
| 6,508,615 B2 | 1/2003 | Taylor |
| 6,523,482 B2 | 2/2003 | Wingate |
| 6,537,002 B2 | 3/2003 | Gloystein |
| 6,557,896 B1 | 5/2003 | Stobart |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,066 B2 | 1/2004 | Moshgbar |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2* | 8/2007 | Eng Soon | B01F 5/241 105/250 |
| 7,284,579 B2 | 10/2007 | Elgan et al. |
| 7,284,670 B2 | 10/2007 | Schmid |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,695,538 B2 | 4/2010 | Cheng |
| 7,753,637 B2 | 7/2010 | Benedict et al. |
| 7,798,558 B2 | 9/2010 | Messier |
| 7,802,958 B2* | 9/2010 | Garcia | B60P 1/52 414/482 |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,867,613 B2 | 1/2011 | Smith |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,213 B1 | 8/2011 | Gauthier et al. |
| 7,997,623 B2 | 8/2011 | Williams |
| 8,083,083 B1 | 12/2011 | Mohns |
| 8,201,520 B2 | 6/2012 | Meritt |
| 8,313,278 B2* | 11/2012 | Simmons | B60P 1/52 414/531 |
| 8,366,349 B2 | 2/2013 | Beachner |
| 8,375,690 B2 | 2/2013 | LaFargue et al. |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Beming et al. |
| 8,469,065 B2 | 6/2013 | Schroeder et al. |
| D688,351 S | 8/2013 | Oren |
| 8,505,780 B2 | 8/2013 | Oren |
| 8,544,419 B1 | 10/2013 | Spalding et al. |
| 8,545,148 B2 | 10/2013 | Wanek-Pusset et al. |
| 8,562,022 B2 | 10/2013 | Nadeau et al. |
| 8,573,387 B2 | 11/2013 | Trimble |
| 8,573,917 B2 | 11/2013 | Renyer |
| 8,585,341 B1* | 11/2013 | Oren | B65G 65/42 222/181.1 |
| D694,670 S | 12/2013 | Oren |
| 8,616,370 B2 | 12/2013 | Allegretti |
| 8,622,251 B2 | 1/2014 | Oren |
| 8,636,832 B2 | 1/2014 | Stutzman et al. |
| 8,646,641 B2 | 2/2014 | Moir |
| 8,662,525 B1 | 3/2014 | Dierks et al. |
| 8,668,430 B2 | 3/2014 | Oren |
| D703,582 S | 4/2014 | Oren |
| 8,820,559 B2 | 9/2014 | Beitler et al. |
| 8,827,118 B2* | 9/2014 | Oren | B65D 88/32 206/221 |
| 8,881,749 B1 | 11/2014 | Smith |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,340,353 B2* | 5/2016 | Oren | B65G 65/42 |
| 9,410,414 B2 | 8/2016 | Tudor |
| D780,883 S | 3/2017 | Schaffner et al. |
| D783,771 S | 4/2017 | Stegemoeller et al. |

(56) References Cited

U.S. PATENT DOCUMENTS

| | | |
|---|---|---|
| D783,772 S | 4/2017 | Stegemoeller, III et al. |
| 9,624,036 B2 | 4/2017 | Luharuka et al. |
| 9,688,492 B2 | 6/2017 | Stutzman et al. |
| 9,796,318 B1 | 10/2017 | Nolasco |
| 2001/0022308 A1 | 9/2001 | Epp et al. |
| 2001/0038777 A1 | 11/2001 | Cassell |
| 2001/0045338 A1* | 11/2001 | Ransil ................. B60P 1/52 193/35 B |
| 2002/0134550 A1 | 9/2002 | Leeson et al. |
| 2002/0139643 A1 | 10/2002 | Peltier et al. |
| 2003/0006248 A1 | 1/2003 | Gill et al. |
| 2003/0024971 A1 | 2/2003 | Jones |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2008/0008562 A1 | 1/2008 | Beckel et al. |
| 2008/0029546 A1 | 2/2008 | Schuld |
| 2008/0029553 A1 | 2/2008 | Culleton |
| 2008/0058228 A1 | 3/2008 | Wilson |
| 2008/0179054 A1 | 7/2008 | McGough et al. |
| 2008/0179324 A1* | 7/2008 | McGough ............ B65D 88/005 220/8 |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2009/0038242 A1 | 2/2009 | Cope |
| 2009/0078410 A1* | 3/2009 | Krenek ................. E21B 43/267 166/244.1 |
| 2009/0223143 A1 | 9/2009 | Esposito |
| 2009/0278326 A1 | 11/2009 | Rowland et al. |
| 2010/0021258 A1* | 1/2010 | Kim .................... B60P 1/52 410/92 |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0072308 A1 | 3/2010 | Hermann et al. |
| 2010/0080681 A1 | 4/2010 | Bain |
| 2010/0108711 A1 | 5/2010 | Wietgrefe |
| 2010/0129193 A1 | 5/2010 | Sherrer |
| 2010/0199668 A1 | 8/2010 | Coustou et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0121003 A1 | 5/2011 | Moir |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1* | 9/2011 | Dugic ................. B60P 1/52 410/92 |
| 2011/0297702 A1 | 12/2011 | Hildebrandt et al. |
| 2012/0017812 A1 | 1/2012 | Renyer |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0247335 A1 | 10/2012 | Stutzman et al. |
| 2012/0255539 A1 | 10/2012 | Kolecki |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1* | 1/2014 | Oren .................... B65D 88/30 414/288 |
| 2014/0034662 A1 | 2/2014 | Chalmers et al. |
| 2014/0044507 A1* | 2/2014 | Naizer ................. B65G 43/00 414/288 |
| 2014/0077484 A1 | 3/2014 | Harrell |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0203046 A1 | 7/2014 | Allegretti |
| 2014/0234059 A1 | 8/2014 | Thomeer |
| 2014/0255137 A1* | 9/2014 | Haertel ................. B60P 1/52 414/529 |
| 2014/0305769 A1 | 10/2014 | Eiden et al. |
| 2014/0321950 A1 | 10/2014 | Krenek et al. |
| 2015/0004895 A1 | 1/2015 | Hammers et al. |
| 2015/0069052 A1 | 3/2015 | Allegretti et al. |
| 2015/0079890 A1 | 3/2015 | Stutzman et al. |
| 2015/0086307 A1* | 3/2015 | Stefan ................. B65D 88/005 414/304 |
| 2015/0086308 A1 | 3/2015 | McIver et al. |
| 2015/0107822 A1 | 4/2015 | Tudor |
| 2015/0110565 A1 | 4/2015 | Harris |
| 2015/0115589 A1 | 4/2015 | Thiessen |
| 2015/0159232 A1 | 6/2015 | Zucchi et al. |
| 2015/0209829 A1 | 7/2015 | De Siqueira et al. |
| 2015/0284183 A1 | 10/2015 | Houghton et al. |
| 2016/0148813 A1 | 5/2016 | Rogers et al. |
| 2016/0177678 A1 | 6/2016 | Morris et al. |
| 2016/0185522 A1 | 6/2016 | Herman et al. |
| 2016/0273355 A1 | 9/2016 | Gosney et al. |
| 2016/0280480 A1 | 9/2016 | Smith et al. |
| 2017/0129721 A1 | 5/2017 | Harris et al. |
| 2017/0217353 A1 | 8/2017 | Vander Pol |
| 2018/0009401 A1 | 1/2018 | Miller et al. |

FOREIGN PATENT DOCUMENTS

| | | |
|---|---|---|
| CN | 2037354 | 5/1989 |
| CN | 2059909 | 8/1990 |
| CN | 2075632 | 4/1991 |
| CN | 1329562 | 1/2002 |
| CN | 2517684 | 10/2002 |
| CN | 1635965 | 7/2005 |
| CN | 2913250 | 6/2007 |
| CN | 201161588 | 12/2008 |
| CN | 201390486 | 1/2010 |
| CN | 101823630 | 9/2010 |
| CN | 102101595 | 6/2011 |
| CN | 201881469 | 6/2011 |
| CN | 102114985 | 7/2011 |
| CN | 203033469 | 7/2013 |
| CN | 103350017 | 10/2013 |
| CN | 203580948 | 5/2014 |
| DE | 3108121 | 9/1982 |
| DE | 3342281 | 6/1985 |
| DE | 4008147 | 9/1990 |
| DE | 4217329 | 5/1993 |

(56) References Cited

FOREIGN PATENT DOCUMENTS

| | | |
|---|---|---|
| DE | 20317967 | 3/2004 |
| EP | 0016977 | 10/1980 |
| EP | 0019967 | 7/1984 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1598288 | 11/2005 |
| EP | 1775190 | 4/2007 |
| EP | 1795467 | 6/2007 |
| EP | 2062832 | 5/2009 |
| EP | 2311757 | 4/2011 |
| FR | 2173445 | 10/1973 |
| FR | 2640598 | 6/1998 |
| GB | 1000621 | 8/1965 |
| GB | 1296736 | 11/1972 |
| GB | 2066220 | 7/1981 |
| GB | 2204847 | 11/1988 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| JP | 11034729 | 2/1999 |
| JP | 2007084151 | 4/2007 |
| MX | 2012011046 | 5/2012 |
| NL | 8105283 | 6/1983 |
| WO | 1990008082 | 8/1990 |
| WO | 1992002437 | 2/1992 |
| WO | 1993001997 | 2/1993 |
| WO | 1993006031 | 4/1993 |
| WO | 1996025302 | 8/1996 |
| WO | 2003024815 | 3/2003 |
| WO | 2006039757 | 4/2006 |
| WO | 2007005054 | 1/2007 |
| WO | 2007057398 | 5/2007 |
| WO | 2007061310 | 5/2007 |
| WO | 2008012513 | 1/2008 |
| WO | 2009087338 | 7/2009 |
| WO | 2010026235 | 3/2010 |
| WO | 2011099358 | 8/2011 |
| WO | 2012058059 | 5/2012 |
| WO | 2012021447 | 4/2014 |

OTHER PUBLICATIONS

Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al v. Grit Energy Solutions LLC*, 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.
2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.
Final Office Action dated Oct. 13, 2017 for co-pending U.S. Appl. No. 15/398,950.
Non-Final Office Action dated Sep. 21, 2017 for co-pending U.S. Appl. No. 15/413,822.
Non-Final Office Action dated Oct. 5, 2017 for co-pending U.S. Appl. No. 14/848,447.
Final Office Action dated Sep. 21, 2017 for co-pending U.S. Appl. No. 14/922,836.
Non-Final Office Action dated Sep. 27, 2017 for co-pending U.S. Appl. No. 14/996,362.
Non-Final Office Action dated Sep. 28, 2017 for co-pending U.S. Appl. No. 13/628,702.
Beard, Tim, Fracture Design in Horizontal Shale Wells—Data Gathering to Implementation, EPA Hydraulic Fracturing Norkshop, Mar. 10-11, 2011.
Benson, Mary Ellen et al., Frac Sand in the United States—A Geological and Industry Overview, U.S. Department of be Interior, U.S. Geological Survey, 2015-2017.
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 6, 2017 for co-pending U.S. Appl. No. 14/927,614.
Final Office Action dated Jun. 21, 2017 for co-pending U.S. Appl. No. 14/943,182.
Randy Lafollette, Key Considerations for Hydraulic Fracturing of Gas Shales, May 12, 2010.
Case No. 4:17-cv-00589, Plaintiffs' P.R. 3-1 and 3-2 Infringement Contentions and Disclosures, Jun. 8, 2017.
FS-35 Desert Frac-Sander& NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, dated Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May 2013.
SandBox Logistics, LLC, screenshots from video made in Apr. 2013 and publicly shown in May 2013, Arnegard, North Dakota.
International Search Report for PCT/US15/35635, dated Oct. 30, 2015. (12 pages).
PCT International Search Report for PCT/US15/49074, dated Dec. 17, 2015. (11 pages).

(56) References Cited

OTHER PUBLICATIONS

PCT International Search Report for PCT/US15/57601, dated May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Smith, Ryan E., Prefab Architecture, A Guide to Modular Design and Construction, John Wiley & Sons, Inc., 2010.
Osha-Niosh, Hazard Alert: Worker Exposure to Silica during Hydraulic Fracturing, Jun. 2012.
Tremoglie, Michael P., Legal NewsLine, OSHA, NIOSH issue fracking health alert (/stories/510527440-oshaniosh-issue-fracking-health-alert), Jun. 25, 2012.
Beckwith, Robin, Proppants: Where in the World, Journal of Petroleum Technology, Apr. 2011.
Final Office Action dated Feb. 27, 2018 for co-pending U.S. Appl. No. 15/143,942.
Solaris Oilfield Infrastructure, Mobile Sand Silo System, 2016.
Final Office Action dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,885.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.

(56) References Cited

OTHER PUBLICATIONS

Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
Non-Final Office Action dated Feb. 24, 2017 for co-pending U.S. Appl. No. 14/943,182.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Apr. 3, 2017 for co-pending U.S. Appl. No. 13/555,635.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Final Office Action dated Mar. 14, 2018 for co-pending U.S. Appl. No. 15/144,450.
Final Office Action dated Apr. 23, 2018 for co-pending U.S. Appl. No. 14/848,447.
Final Office Action dated Mar. 16, 2018 for co-pending U.S. Appl. No. 14/996,362.
International Organization for Standardization, ISO 668:1995(E).
International Organization for Standardization, ISO 668:1995(E)/Amd.1:2005(E).
International Organization for Standardization, ISO 668:1995(E)/Amd.2:2005(E).
International Organization for Standardization, ISO 1496-1:1990/Amd.1:1993(E).
International Organization for Standardization, ISO 1496-1:1990/Amd.2:1998(E).
International Organization for Standardization, ISO 1496-1:1990/Amd.3:2005(E).
International Organization for Standardization, ISO 1496-1:1990/Amd.4:2006(E).
International Organization for Standardization, ISO 1496-1:1990/Amd.5:2006(E).
Rastikian, K. et al., Modelling of sugar drying in a countercurrent cascading rotary dryer from stationary profiles of temperature and moisture, Journal of Food Engineering 41 (1999).
ISO 1496-1: International Standard, Series 1 Freight Containers—Specification and Testing—Part 1, General Cargo containers, Fifth Edition, Aug. 15, 1990.
ISO 6346: International Standard, Freight Containers—Coding, Identification and Marking, Third Edition, Dec. 1, 1995.
ISO/IEC 15416: International Standard, Information Technology—Automatic Identification and Data Capture Techniques—Bar Code Print Quality Test Specification—Linear Symbols, First Edition, Aug. 15, 2000.
Hoel, Lester A., Giuliano, Genevieve and Meyer, Michael D., Portions of Intermodal Transportation: Moving Freight in a Global Economy, Copyright Eno Transportation Foundation, 2011.
Itsumi Nagahama, English translation of Japan Unexamined Application No. S4871029, Dec. 14, 1971.
Final Office Action dated Jan. 22, 2018 for co-pending U.S. Appl. No. 13/628,702.
Final Office Action dated Jan. 25, 2018 for co-pending U.S. Appl. No. 15/602,666.
Final Office Action dated Feb. 6, 2018 for co-pending U.S. Appl. No. 15/475,354.
Non-Final Office Action dated Feb. 9, 2018 for co-pending U.S. Appl. No. 15/587,926.
Non-Final Office Action dated Feb. 15, 2018 for co-pending U.S. Appl. No. 14/922,836.
Final Office Action dated Dec. 27, 2017 for co-pending U.S. Appl. No. 14/943,182.
International Search Report for related International Application No. PCT/US2012/066639, dated Feb. 25, 2013.
International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2013.
International Preliminary Report on Patentability for PCT/US2013/032819, dated Sep. 23, 2014.
International Search Report for PCT/US2015/012990, dated May 6, 2015. (15 pages).
Arrows Up, Inc., Jumbo BTS—Bulk Transport System, Aug. 1, 2014.
Arrows Up, Inc., Reusable Packaging Association, Member Spotlight John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.

(56) References Cited

OTHER PUBLICATIONS

Monster Tanks, Inc., Sand Monster Website, http://monstertanksinc.com/sandmonster.html, 2012.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4pages).
WW Trailers Inc., Model GN204S9A datasheet, Portland, OR, Jan. 2007 (4pages).

\* cited by examiner

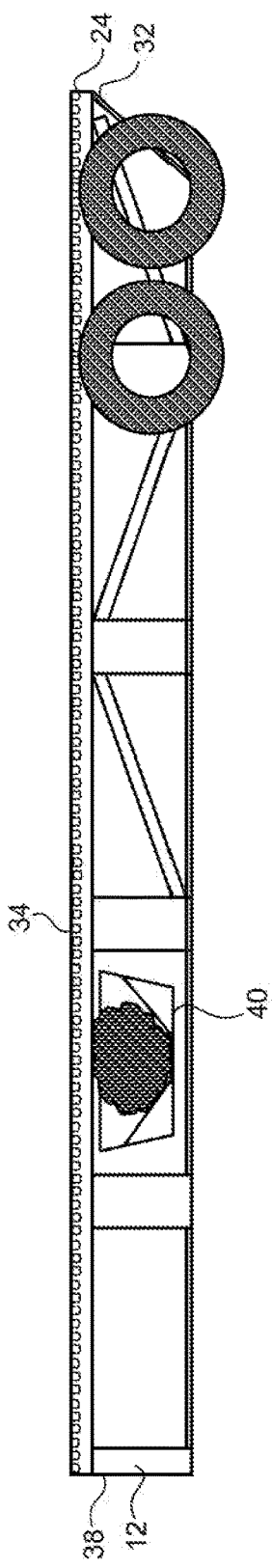
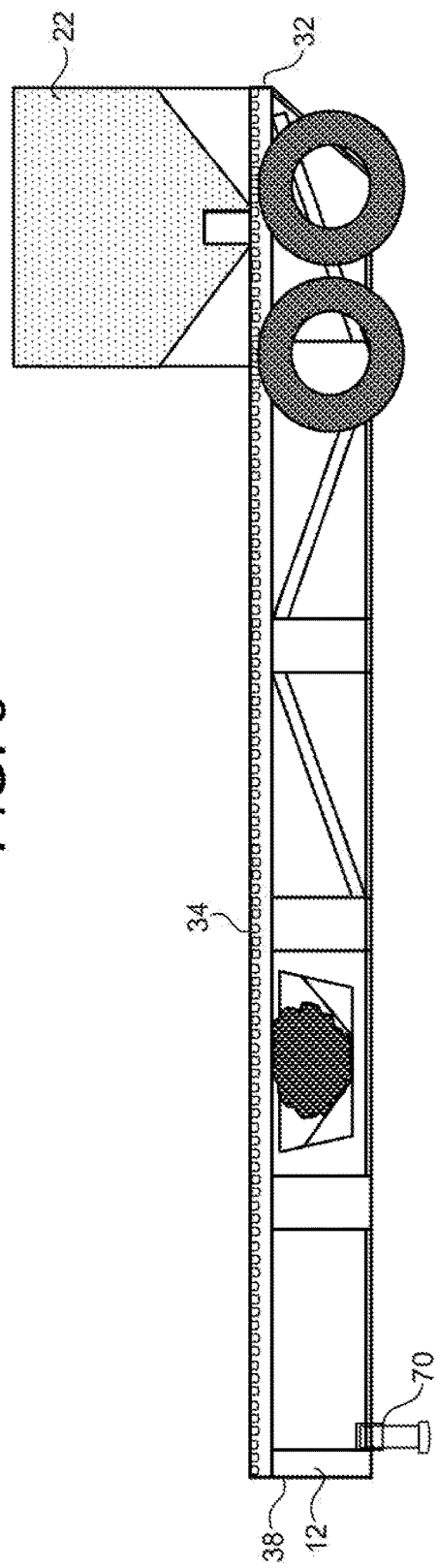

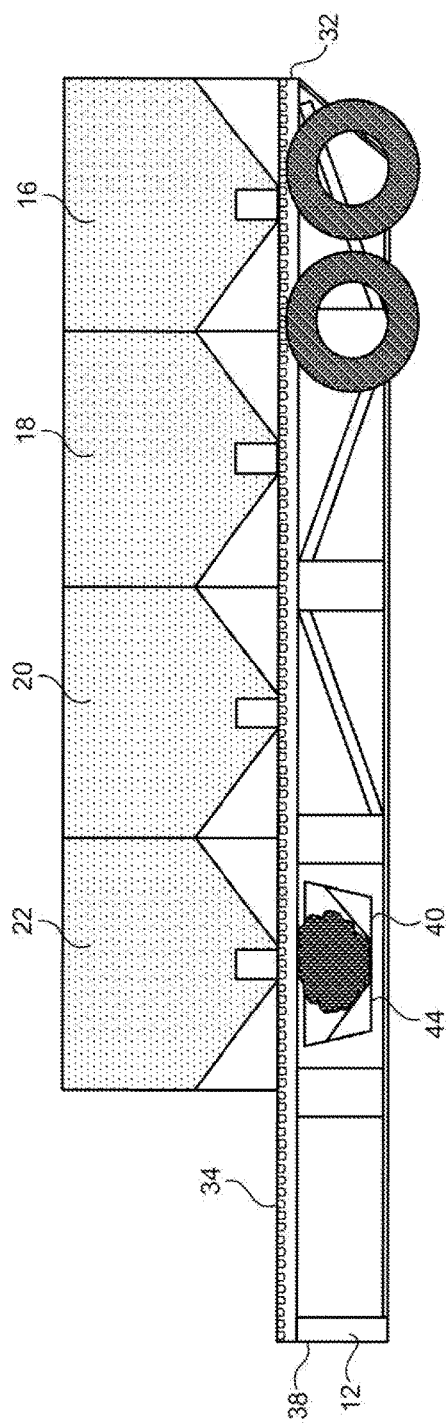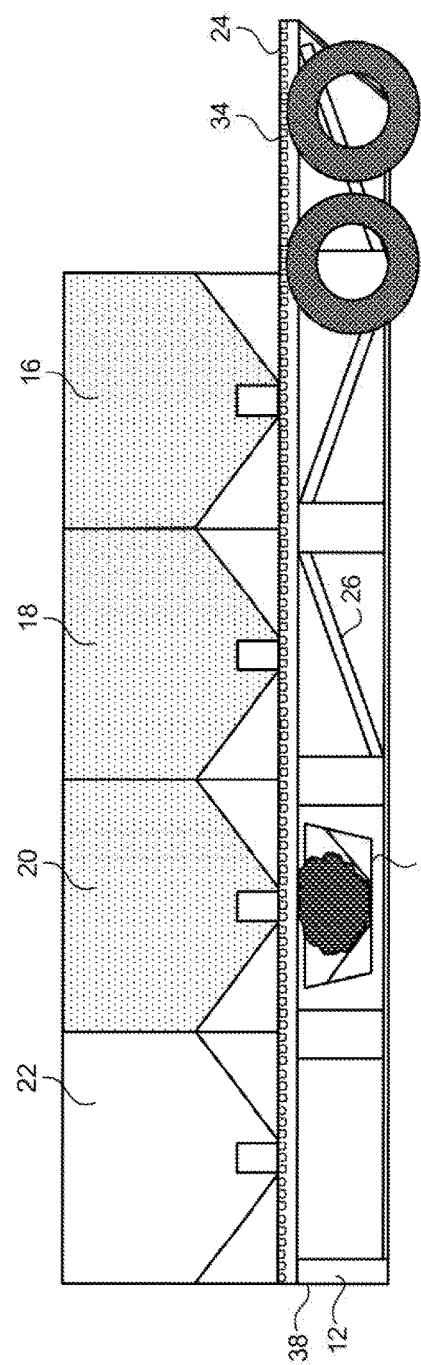

TRAILER-MOUNTED PROPPANT DELIVERY SYSTEM

CROSS-REFERENCE TO RELATED APPLICATIONS

The present application is a continuation which claims priority to and the benefit of U.S. application Ser. No. 15/152,744, filed on May 12, 2016, and titled "Trailer-Mounted Proppant Delivery System," which is a continuation of U.S. application Ser. No. 14/175,340, filed on Feb. 7, 2014, and titled "Trailer-Mounted Proppant Delivery System," now U.S. Pat. No. 9,421,899, issued Aug. 23, 2016, which is incorporated herein by reference in its entirety. U.S. application Ser. No. 15/152,744 is also a continuation-in-part of U.S. application Ser. No. 13/628,702, filed on Sep. 27, 2012, and titled "Proppant Discharge System and a Container for Use in Such a Proppant Discharge System," which is a continuation-in-part of U.S. application Ser. No. 13/555,635, filed on Jul. 23, 2012, and titled "Proppant Discharge System Having a Container and the Process for Providing Proppant to a Well Site," all of which are incorporated herein by reference in their entireties.

BACKGROUND OF THE INVENTION

1. Field of the Invention

The present invention relates to the delivery of proppant to a well site. More particularly, the present invention relates to proppant containers and techniques for causing the proppant containers to discharge proppant therein onto a conveyor, or other means, for transport to the well site. The present invention also relates to a truck trailer that is suitable for allowing loads thereon to be translatably moved along the length of the trailer.

2. Description of Related Art Including Information Disclosed Under 37 CFR 1.97 and 37 CFR 1.98

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevent the fractures from closing when the injection is stopped.

With the rise of hydraulic fracturing over the past decade, there is a steep climb in proppant demand. Global supplies are currently tight. The number of proppant suppliers worldwide has increased since 2000 from a handful to well over fifty sand, ceramic proppant and resin-coat producers.

By the far the dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size is critical, as any given proppant must reliably fall within certain mesh ranges, subject to downhole conditions and completion design. Generally, coarser proppant allows the higher flow capacity due to the larger pore spaces between grains. However, it may break down or crush more readily under stress due to the relatively fewer grain-to-grain contact points to bear the stress often incurred in deep oil- and gas-bearing formations.

Typically, in any hydraulic fracturing operation, a large amount of such proppant is required. Typically, it has been difficult to effectively store the proppant at the fracturing sites. Additionally, it has been found to be rather difficult to effectively transport the proppant to the desired location. Often, proppant is hauled to the desired locations on the back of trucks and is dumped onsite. Under such circumstances, the proppant is often exposed to adverse weather conditions. This will effectively degrade the quality of the proppant during its storage. Additionally, the maintenance of proppant in containers at the hydraulic fracturing site requires a large capital investment in storage facilities. Typically, the unloading of such storage facilities is carried out on a facility-by-facility basis. As such, there is a need to be able to effectively transport the proppant to and store the proppant in a desired location adjacent to the hydraulic fracturing location.

In the past, there have been various patent applications publications that have been published and patents issued by the present inventor in relation to containers for the transport of proppant. For example, U.S. Pat. No. 8,505,780, issued on Aug. 13, 2013 to the present inventor, describes a proppant storage vessel that has a first container with an interior volume and a second container supported in spaced relation above the first container. The first container has a bottom hatch affixed to a bottom wall thereof. The bottom hatch is movable between an open position and a closed position. The first container has an opening at a top wall thereof. The second container has bottom hatch formed on a bottom wall thereof. The bottom hatch of the second container is aligned with the opening of the first container such that a proppant in the second container can flow through the hatch thereof into the interior volume of the first container. Each of the containers includes first, second, third and fourth inclined surfaces positioned in the interior volume and extending from the respective side walls and end walls thereof toward the bottom hatch.

U.S. Patent Publication No. 2013/0164112, published on Jun. 27, 2013 to the present inventor, describes a system of delivering and storing proppant for use at a well site and container for such proppant. The method includes the step of transporting a load of proppant in a vessel to a desired location, moving the load of proppant from the vessel into a container so as to create a proppant-loaded container, unloading the proppant-loaded container into a pneumatic bulk trailer, and transporting the unloaded proppant in the pneumatic bulk trailer to well site. The container is placed onto a bed of a truck and moved in proximity to the vessel. The proppant-loaded container is placed onto a tilting mechanism and then tilted so that the proppant is discharged through a flow gate of a container into a hopper.

U.S. Patent Publication No. 2013/0161211, published on Jun. 27, 2013 to present inventor, describes a proppant storage vessel that has a first container with an interior volume and a second container supported in spaced relationship above the first container. The first container has a bottom hatch affixed to a bottom wall thereof. The bottom hatch is movable between an open position and a closed position. The second container has bottom hatch formed on a bottom wall thereof. The bottom hatch of the second container is aligned with the opening of the first container such that a proppant in the second container can flow through the hatch thereof into the interior volume of the first container.

A variety of designs patents have issued relating to containers for the transport and storage of proppant. For example, U.S. Design Pat. Nos. 688,349, 688,350 and 688,351, issued on Aug. 20, 2013 to the present inventor, all describe various designs of proppant vessels. U.S. Design Pat. No. D688,722, issued on Aug. 27, 2013 to the present inventor, also describes a design of a proppant vessel.

In the past, various patents have also issued relating to container trailers. For example, U.S. Pat. No. 4,541,768, issued on Sep. 17, 1985 to Walker et al., describes a container trailer having a vertically movable roller tray with parallel rollers thereon which, when tangent to the roll plane, allow the container to be moved onto or off of the trailer. A vertically movable caster tray of the trailer has fixed caster wheels thereon with their axes of rotation intersecting a vertical axis near the center of the trailer. When the wheels provide sole support for the container at the roll plane, the container may be rotated about the vertical axis to any desired position.

U.S. Pat. No. 7,100,896, issued on Sep. 5, 2006 to H. Cox, describes a shipping container handling system that includes a plurality of powered jacks each of which includes upper and lower container attachment members and are selectively engageable with upper and lower corner lock castings of the containers. Each attachment member is carried by a guide sleeve slideably mounted relative to a vertical standard with an upper guide sleeve being drivingly engaged with a power driven member such that, with the attachment members engaged with the corner locks of the container, the simultaneous activation of four jacks allows the elevation and/or lowering of a shipping container relative to a vehicle.

U.S. Pat. No. 7,134,829 issued on Nov. 14, 2006 to Quenzi et al., provides a cargo trailer that includes a frame, at least two axles mounted to the frame, and a deck. The axles have wheels at opposite ends of the axles for movably supporting the frame above the earth. The deck is pivotally mounted to the frame and is pivotable about a first axis relative to the frame and a second axis relative to the frame via at least two supports.

U.S. Pat. No. 7,866,933, issued on Jan. 11, 2011 to Welch et al., discloses a container trailer that has a frame positionable as a single unit about a container such that the frame can be attached to the container in four regions of the container so as to lift the container. The trailer frame can be positioned about the container by laterally expanding and retracting, pivoting about a horizontal axis, and pivoting about a vertical axis.

U.S. Pat. No. 7,802,958, issued on Sep. 28, 2010 to Garcia et al., teaches a versatile trailer deck and to a method for moving cargo onto such a trailer deck. The trailer deck can have first and second moving apparatus attached to a deck member. The first moving apparatus is adapted to move cargo between the back end of the deck member and the front end of the deck member. The second moving apparatus is adapted to rotate cargo from one orientation on the deck member to a second orientation on the deck member. A plurality of rollers are supported on the pivotable deck.

U.S. Pat. No. 7,950,675, issued on May 31, 2011 to Quenzi et al., shows a cargo carrier for movably supporting cargo. The cargo carrier has a frame configured to support the cargo and at least two wheels at each side of the frame. Each of the wheels is rotatably mounted to a respective support arm. The support arms are pivotally mounted to respective sides of the frame and are pivotable relative to the frame to adjust at least one of a height and tilt of the frame relative to a support surface. The cargo carrier can include a deck that is movably mounted to the frame and is longitudinally movable along the frame.

U.S. Pat. No. 8,182,193, issued on May 22, 2012 to Gaudet et al., provides a trailer for transporting freight containers. This trailer has a frame having a front frame section which is adapted to be coupled to a suitable road vehicle. A pair of displaceable horizontal side beams are secured to the front frame section and are provided with a hingeable rear gate formed by a pair of hinge arms. Container lifting posts are secured to opposed ends of the front frame section and the hinge arms for removable connection to a container positioned between the side beams to lift and lower the container therebetween.

U.S. Pat. No. 8,313,278, issued on Nov. 20, 2012 to Simmons et al., provides a modular interchangeable cargo deck which is configured to be removably and interchangeably attached to a trailer. The deck unit can include a plurality of moving apparatus for moving cargo in a lengthwise direction relative to the deck units and for moving cargo in a vertical direction relative to the deck unit.

In these prior art references, it is quite clear that none of the trailers are adapted for the use in association with delivering proppant to a well site. The complication with such trailers involves the configuration of the proppant storage containers and also the weight of the proppant that is contained within such containers. None of the prior art references are particularly adaptable for allowing the discharge of proppant from a container to a location below the bed of the trailer. Additionally, and furthermore, none of the prior art references disclose a technique whereby the trailer can be relatively easily loaded and/or unloaded through the use of simple lifting mechanisms and/or forklifts.

U.S. Design Pat. No. D688,597, issued on Aug. 27, 2013 to the present inventor, shows a trailer for proppant containers. The trailer has a unique external appearance and is suitable for supporting a container of proppant in a fixed position on a top surface of the trailer.

It is an object of the present invention to provide an apparatus and process for proppant to a well site which conveniently and easily allows the proppant to be delivered.

It is another object of the present invention to provide an apparatus and process for the delivery of proppant to a well site which allows the proppant containers to be easily placed and removed from the bed of a trailer with simple lifting mechanisms and/or forklifts.

It is another object of the present invention to provide an apparatus and process for the delivery of proppant to a well site which minimizes the number of movable components associated with the delivery of proppant.

It is still a further object of the present invention to provide an apparatus and process for the delivery of proppant to a well site which can be easily moved along a roadway or at the well site so as to be located in a desired position.

It is a further object of the present invention to provide an apparatus and process for the delivery of proppant to a well site that is easy to use, relatively inexpensive and easy to manufacture.

These and other objects and advantages of the present invention will become apparent from a reading of the attached specification and appended claims.

BRIEF SUMMARY OF THE INVENTION

The present invention is an apparatus for delivering proppant to a well site. The apparatus of the present invention includes a trailer with a bed thereon and at least one track of rollers that extend in parallel relationship to the longitudinal axis of the bed of the trailer. The trailer has wheels connected thereto so as to allow the trailer to move along an underlying surface. The track of rollers extends substantially for an entire length of the bed of the trailer.

In the present invention, at least one proppant container is translatably positioned on the track of rollers. The proppant container is movable along the track of rollers from one end of the bed to an opposite end of the bed. A conveying means serves to receive proppant from the proppant container in a position below the bed of the trailer. The conveying means includes a bin positioned below the bed of the trailer in a position rearward of the front end of the trailer and forward of a rear end of the trailer. The conveying means further includes a conveyor cooperative with the bin so as to move proppant from the bin to another location. The proppant is discharged from the proppant container through the bed of the trailer and into the bin.

The track of rollers includes a first track of rollers extending longitudinally along the bed of the trailer and a second track of rollers extending longitudinally along the bed of the trailer. The second track of rollers is in spaced parallel relationship to the first track of rollers. A plurality of proppant containers are arranged in end-to-end relationship along the bed of the trailer. The proppant container can include a container body and an outlet opening formed at a bottom of the container body. The outlet opening is movable between a closed position and an open position so as to allow proppant to be discharged from the interior volume of the container body.

The present invention is also a process for delivering proppant to a well site. The process of the present invention includes the steps of: (1) forming a trailer having at least one track of rollers extending longitudinally along a bed of the trailer; (2) placing a first proppant container onto the track of rollers adjacent one end of the bed of the trailer; (3) moving the first proppant container along the track of rollers to a position away from one end of the bed of the trailer; (4) discharging proppant from the first proppant container at the position away from the one end of the bed of the trailer; and (5) conveying the discharge proppant to a location at the well site.

In the process of the present invention, the step of moving includes placing a second proppant container onto the track of rollers adjacent the one end of the bed of the trailer such that the second proppant container bears against the first proppant container so as to cause the first proppant container to translate along the track of rollers. The step of moving includes placing a plurality of proppant containers onto the track of rollers so as to urge the first container to the position for the step of discharging. The discharged proppant container is moved along the track of rollers to a position adjacent an opposite end of the bed of the trailer. This discharged proppant container can be removed from the bed of the trailer.

The step of conveying includes the steps of placing a bin below the bed of the trailer at a location away from the one end of the bed of the trailer such that the proppant can discharge into the bin, and conveying the proppant from the bin to the location at the well site. The step of forming a trailer includes the step of affixing a pair of tracks of rollers onto the bed of the trailer in which the tracks of rollers are in parallel relationship to each other and extend substantially for an entire length of the bed of the trailer. The first proppant container includes an openable discharge outlet. The process of the present invention includes opening the discharge outlet when the first proppant container is moved to the position away from the one end of the bed of the trailer.

The foregoing Section is intended to describe, in particularity, the preferred embodiment of the present invention. It is understood that modifications to this preferred embodiment can be made within the scope of the present invention. As such, this Section should not to be construed, in any way, as limiting of the scope of the present invention. The present invention should only be limited by the following claims and their legal equivalents.

BRIEF DESCRIPTION OF THE SEVERAL VIEWS OF THE DRAWINGS

FIG. 3 is a side elevational view showing the trailer as used in the apparatus of the present invention in an unloaded condition.

FIG. 4 shows an initial step in the process of the present invention in which a single proppant storage container is loaded onto the end of the trailer.

FIG. 5 shows a further step in the process of the present invention in which an empty proppant container has been removed from the forward end the trailer.

FIG. 6 shows a further step in the process of the present invention in which the discharged proppant container is moved forward along the trailer.

DETAILED DESCRIPTION OF THE INVENTION

Figure 1:
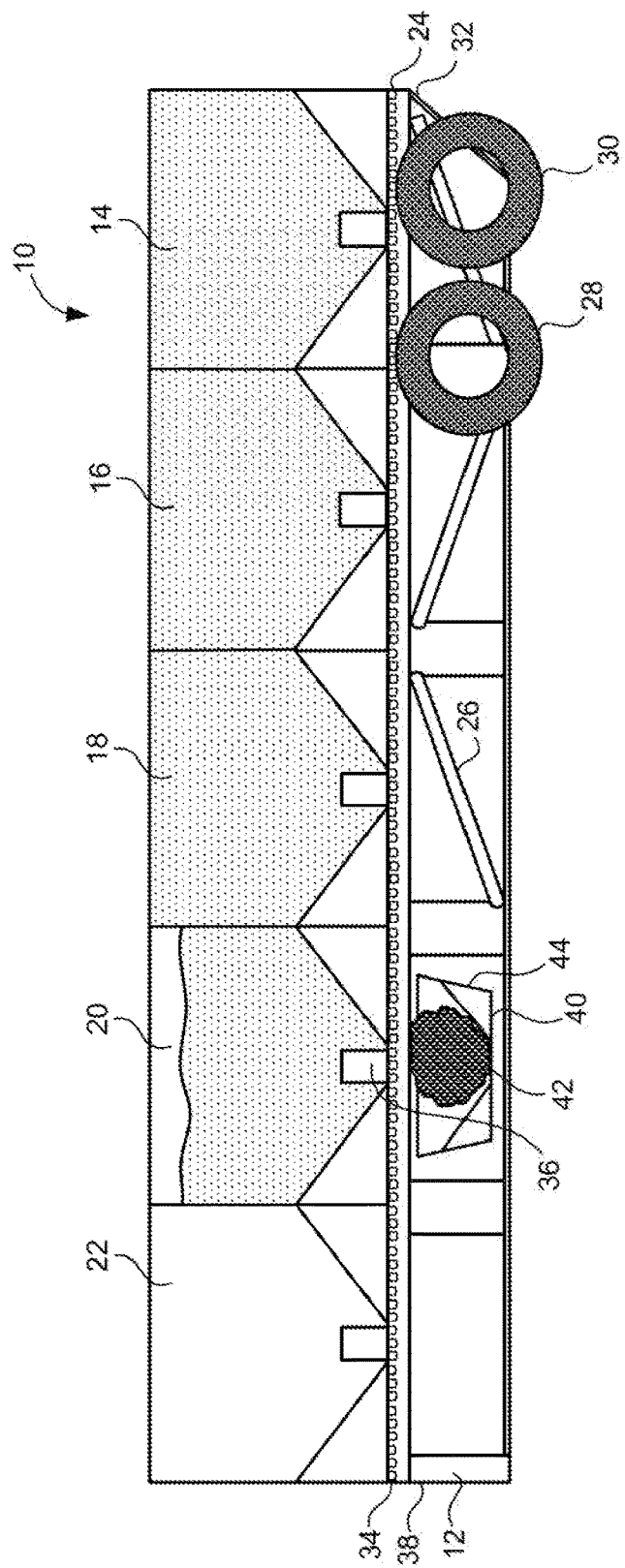
FIG. 1 is a side elevational view showing the apparatus for the delivering of proppant in accordance with the preferred embodiment of the present invention.

Referring to FIG. 1, there is shown the apparatus 10 in accordance with the teachings of the present invention. The apparatus 10 includes a trailer 12 having a plurality of proppant storage containers 14, 16, 18, 20 and 22 positioned on the bed 24 of the trailer 12. The trailer 12 has a structural framework 26 secured to the bed 24 of the trailer 12 so as to enhance the structural integrity of the trailer 12. A pair of wheels 28 and 30 are illustrated as supporting the bed 24 of the trailer 12 adjacent the rear end 32 of the trailer 12. A track of rollers 34 is positioned on the bed 24 of the trailer 12. Each of the containers 14, 16, 18, 20 and 22 is supported by the track of rollers 34.

In FIG. 1, each of the containers 14, 16, and 18 are fully loaded with the proppant material. Container 14 is located at the end 32 of the trailer 12. The container 16 is located adjacent to the end of the container 14 opposite the end 32 of the trailer 12. Similarly, the container 18 is positioned against the end of the container 16 and generally located at the center of the trailer 12. Container 20 is illustrated as being partially filled with proppant material. Container 20 includes a discharge outlet 36 located at the bottom thereof. Each of the containers 14, 16, 18, 20 and 22 will have a discharge outlet 36. The discharge outlet 36 is particularly configured so as to be openable so as to allow for the discharge of proppant from the interior of the container through the bottom of the container. Container 22 is located at the forward end 38 of the trailer 12. Container 22 is illustrated as being empty of proppant material. As such, container 22 represents a discharged container.

In FIG. 1, it can be seen that there is a conveying means 40 positioned below the bed 24 of the trailer 12 in a location between the rearward end 32 and the forward end 38. In particular, the conveying means 40 will be located below the discharge outlet 36 of the container 20. It can be seen in FIG. 1, that the proppant material 42 has been discharged into a bin 44. A conveyor can be cooperative with the bin 44 so as to cause the proppant 42 to be transported to a desired location at the well site. The conveyor can be in the nature of an auger that rotates so as to draw proppant material therealong to the desired location at the well site. The bin 44 can also be in the nature of a blender that is used to blend the proppant material with other chemicals for delivery to the well site.

Figure 2:
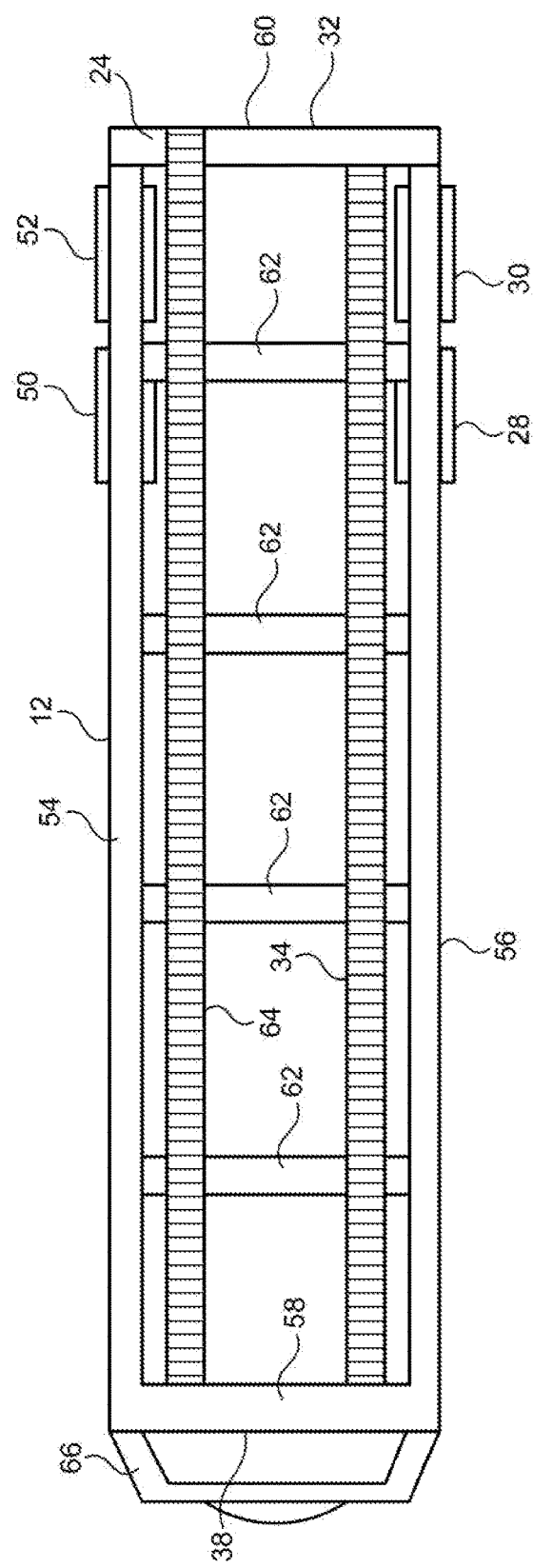
FIG. 2 is a plan view showing the trailer as used in the apparatus of the present invention.

FIG. 2 is a plan view showing the trailer 12. It can be seen that the trailer 12 has a forward end 38 and a rearward end 32. Wheels 28, 30, 50 and 52 are rotatably mounted to the trailer 12 so as to allow the trailer 12 to move upon an underlying surface. The trailer 12 includes side beams 54 and 56. End beans 58 and 60 create a rectangular configuration of the bed 24 of the trailer 12. Cross members 62 extend between the side beams 54 and 56 so as to provide structural integrity of the trailer 12. Various other structural components can be added to these components so as to further enhance the structural integrity of the trailer 12.

In FIG. 2, it can be seen that there is a first track of rollers 34 that extends longitudinally along the bed 24 of the trailer 12 and substantially for the entire length of the trailer 12. A second track of rollers 64 is positioned in spaced parallel relationship to the first track of rollers 34. The tracks of rollers 34 and 64 provide a surface upon which a proppant container can be placed. The rollers are suitably configured so that the containers can be easily moved by simply pushing on one end the proppant container so that the proppant container can translate along the surfaces of the rollers of tracks 34 and 64.

In FIG. 2, it can be seen that there is a trailer hitch 66 formed at the end 38. The trailer hitch 66 allows the trailer 12 to be connected to a towing vehicle. As such, the trailer 12 can be transported to any desired location and properly manipulated at the well site so as to be in proper position such that the conveying means 40 (as shown in FIG. 1) can be placed in a proper position beneath the bed 24 of the trailer 12.

FIG. 3 illustrates an initial step in the process of the present invention. In FIG. 3, it can be seen that the trailer 12 has the track of rollers 34 exposed at the top surface thereof. As such, the track of rollers 34 placed upon bed 24 can provide a surface for the receipt of proppant containers thereon. The conveying means 40 is located rearwardly of the front end 38 of the trailer 12 and forward of the rear end 32 of the trailer. In particular, the conveying means 40 will be in a position so as to receive proppant from a container away from the end 32.

In the process of the present invention, there is an adjustable dolly or foot 70 that is located adjacent to the front end 38 of the trailer 12. This foot 70 can be suitably adjustable so that the track of rollers 34 is in generally a horizontal orientation. As such, the trailer 12 can be adaptable to various surface inclinations or irregularities.

In FIG. 4, it can be seen that the proppant container 22 is loaded onto the track of rollers 34 adjacent to the end 32. Container 22, as shown in FIG. 4, is filled with proppant material.

In FIG. 5, the proppant container 22 is positioned over the conveying means 40. In order to allow this position to be obtained, another proppant container 20 can be positioned on the track of rollers 34 so as to urge the proppant container 22 away from the end 32 of the trailer 12. Similarly, a proppant container 18 can be placed onto the end 32 of the trailer 12 so as to urge the containers 20 and 22 along the track of rollers 34. Additionally, a proppant container 14 can be placed onto the end 32 of the trailer 12 to urge the containers 18, 20 and 22 further toward the forward end 38 of the trailer 12.

In the configuration show in FIG. 5, the filled containers 14, 18, 20 and 22 are located on the track of rollers 34. The proppant container 22 is located directly above the conveying means 40. As such, container 22 is located in a proper position for discharge. The discharge opening 36 of container 22 can be opened so as to discharge the proppant material into the bin 44 of the conveying means 40. As such, the proper discharge of proppant material can be achieved by the present invention. In FIG. 5, each of the proppant containers can be simply and easily loaded upon the track of rollers 34 through the use of a forklift, or other simple lifting mechanism. As such, specialized equipment would not be necessary so as to achieve the proper discharge of proppant material in the manner described hereinabove.

In FIG. 6, it can be seen that the proppant container 22 has been fully discharged and is moved to a position adjacent to the end 38 of the trailer 12. The container 20 is now located in a position above the bin 44 and suitable for discharge. Bin 18 is moved forward so as to urge bin 20 to its proper position. The container 16 is also moved forward along the track of rollers 34. Container 22 is now in a proper condition for removal from the bed 24 of the trailer 12. Since the container 22 is empty, it can easily be removed from the bed 24. The containers 16, 18, 20 and 22 can be moved forward in the manner described hereinabove by the addition of a container 14 (as shown in FIG. 1) upon the track of rollers 34 of trailer 12. As such, the bin 14 will assume the position shown in FIG. 1. As a result, the trailer 12 is capable of handling up to five (5) proppant containers thereon.

In the method of the present invention, containers can be continuously loaded onto the trailer 12 for as long as proppant delivery is required. It is only necessary to discharge the container over the conveying means, remove the empty container, and then move the remaining filled containers so that they will move the discharged container toward the end 38 of the trailer 12. This process can continue, as required, until such time as all of the proppant is properly received at the location at the well site.

The present invention is believed to be capable of allowing the movement of fully filled proppant containers easily by hand or by mechanical manipulation. For example, a forklift can be used so as to lift a filled proppant container, place the proppant container on the track of rollers, and then urge the proppant container forward so as to push the remaining containers forward. The process of the present invention further allows for the filling of the emptied or discharged container during the process. As such, if proppant material is available at the well site, the discharged container can then be replaced onto the track of rollers 34 at the end 32 of the trailer 12 for further continuous processing of proppant material. Ultimately, the discharged proppant containers can be transported by the trailer 12 to other locations for refilling. The present invention provides a simple, easy, and convenient manner of providing proper quantities of proppant material for the desired fracturing operations.

The present application is a continuation which claims priority to and the benefit of U.S. application Ser. No. 15/152,744, filed on May 12, 2016, and titled "Trailer-Mounted Proppant Delivery System," which is a continuation of U.S. application Ser. No. 14/175,340, filed on Feb. 7, 2014, and titled "Trailer-Mounted Proppant Delivery System," now U.S. Pat. No. 9,421,899, issued Aug. 23, 216, which is incorporated herein by reference in its entirety. U.S. application Ser. No. 15/152,744 is also a continuation-in-part of U.S. application Ser. No. 13/628,702, filed on Sep. 27, 2012, and titled "Proppant Discharge System and a Container for Use in Such a Proppant Discharge System," which is a continuation-in-part of U.S. application Ser. No. 13/555,635, filed on Jul. 23, 2012, and titled "Proppant Discharge System Having a Container and the Process for Providing Proppant to a Well Site," all of which are incorporated herein by reference in their entireties.

The foregoing disclosure and description of the invention is illustrative and explanatory thereof. Various changes in the details of the illustrated construction or in the steps of the described process, can be made within the scope of the appended claims without departing from the true spirit of the invention. The present invention should only be limited by the following claims and their legal equivalents.

That claimed is:

1. An apparatus for delivering proppant to a well site, the apparatus comprising:
    a support structure having a bed for receiving a plurality of proppant containers, the support structure having one or more cross members to provide structural support for the plurality of proppant containers when positioned thereon, the plurality of proppant containers being any plurality of containers capable of transporting proppant; and
    a bin positioned below one or more of the plurality of proppant containers and proximate a surface of the bed, the bin being at least partially bound by the cross members of the support structure, having one or more slanted sides to funnel the proppant downward and away from the one or more of the plurality of proppant containers, and having a flow path extending through the bin, the bin being rigidly coupled to the support structure, and the one or more slanted sides of the bin extending downwardly and inwardly toward the flow path and being positioned to allow flow of the proppant to be directed out of the bin via gravity feed.

2. The apparatus of claim 1, further comprising conveying means positioned proximate the bin to receive proppant from one or more of the plurality of proppant containers when one or more of the plurality of proppant containers is positioned to overlie the bin and for conveying the proppant received from the bin and away from one or more of the plurality of proppant containers.

3. The apparatus of claim 2, wherein the conveying means comprises one or more of an auger, a conveyor, and a chute.

4. The apparatus of claim 1, further comprising wheels coupled to the support structure to facilitate movement of the support structure, and wherein the flow path of the bin is further positioned to substantially underlie an outlet of an overlying proppant container when positioned on the support structure so that proppant readily flows by gravity feed from the proppant container outlet and into the bin to be directed away from the proppant container.

5. The apparatus of claim 1, wherein one or more of the plurality of proppant containers is positioned substantially centered over an inlet of the bin when positioned on the support structure and overlying the bin such that when proppant flows through an outlet in a bottom portion of the container the proppant is funneled along the one or more slanted sides and toward the flow path.

6. The apparatus of claim 1, wherein the support structure comprises vertical support members arranged proximate the bin, the vertical support members being in a spaced apart relationship to form one or more openings to enable visual access to the one or more slanted sides of the bin.

7. The apparatus of claim 1, further comprising a foot associated with the support structure, the foot being adjustable to change a horizontal orientation of the bed of the support structure.

8. An apparatus for delivering proppant to a well site, the apparatus comprising:
    a support structure having a bed for receiving a plurality of proppant containers, the support structure having one or more cross members to provide structural support for the plurality of proppant containers when positioned thereon, the plurality of proppant containers being any plurality of containers capable of transporting proppant; and
    a bin positioned below one or more of the plurality of proppant containers and proximate a surface of the bed, the bin being at least partially bound by the cross members of the support structure, having one or more slanted sides to funnel the proppant downward and away from the one or more of the plurality of proppant containers, having an inlet positioned to substantially underlie an outlet of one or more of the plurality of proppant containers when positioned on the support structure to overlie the bin, and being rigidly coupled to the support structure, and the one or more slanted sides of the bin further extending downwardly and inwardly toward a flow path positioned to allow flow of the proppant to be directed out of the bin via gravity feed.

9. The apparatus of claim 8, further comprising conveying means positioned proximate the bin to receive proppant from one or more of the plurality of proppant containers when one or more of the plurality of proppant containers is positioned to overlie the bin and for conveying the proppant received from the bin and away from the proppant container.

10. The apparatus of claim 9, wherein the conveying means comprises one or more of an auger, a conveyor, and a chute.

11. The apparatus of claim 8, wherein the inlet is positioned proximate the bed of the support structure.

12. The apparatus of claim 8, wherein one or more of the plurality of proppant containers is positioned substantially centered over an inlet of the bin when positioned on the support structure and overlying the bin such that when proppant flows through an outlet in a bottom portion of the container the proppant is funneled along the one or more slanted sides and toward the flow path.

13. The apparatus of claim 8, wherein the support structure comprises vertical support members arranged proximate the bin, the vertical support members being in a spaced apart relationship to form one or more openings to enable visual access to an exterior surface of the one or more slanted sides of the bin.

14. The apparatus of claim 8, further comprising a foot associated with the support structure, the foot being adjustable to change a horizontal orientation of the bed of the support structure.

* * * * *